No. 858,490. PATENTED JULY 2, 1907.
F. P. VAUGHAN.
WHEEL.
APPLICATION FILED MAR. 9, 1906.

2 SHEETS—SHEET 1.

Witnesses
Howard D. Orr.
John B. Siggers.

Inventor,
Frederick P. Vaughan,
By C. J. Siggers
H. J. Riley, Attorneys

No. 858,490. PATENTED JULY 2, 1907.
F. P. VAUGHAN.
WHEEL.
APPLICATION FILED MAR. 9, 1906.

2 SHEETS—SHEET 2.

Frederick P. Vaughan, Inventor,

Witnesses

UNITED STATES PATENT OFFICE.

FREDERICK P. VAUGHAN, OF CHICAGO, ILLINOIS.

WHEEL.

No. 858,490.  Specification of Letters Patent.  Patented July 2, 1907.

Application filed March 9, 1906. Serial No. 305,166.

*To all whom it may concern:*

Be it known that I, FREDERICK P. VAUGHAN, a citizen of the United States, residing at Chicago, in the county of Cook and State of Illinois, have invented certain new and useful Improvements in Wheels, of which the following is a specification.

The invention relates to improvements in wheels.

The object of the present invention is to improve the construction of wheels, and to provide simple, inexpensive, and efficient means for enabling the weight of a load to be utilized to aid the rotation of the wheel in starting a vehicle, machine, or other traveling device, and in traveling over an obstruction, and in ascending an acclivity.

A further object of the invention is to provide a wheel having means for applying the draft to it at a point in advance of the load carrying means, and for simultaneously shifting the load carrying means to a point in advance of the vertical diameter of the wheel, whereby the weight will operate to rotate the wheel.

With these and other objects in view, the invention consists in the construction and novel combination and arrangement of parts, hereinafter fully described, illustrated in the accompanying drawings, and pointed out in the claims, hereto appended; it being understood that various changes in the form, proportion, size, and minor details of construction, within the scope of the claims, may be resorted to without departing from the spirit or sacrificing any of the advantages of the invention.

Figure 1:
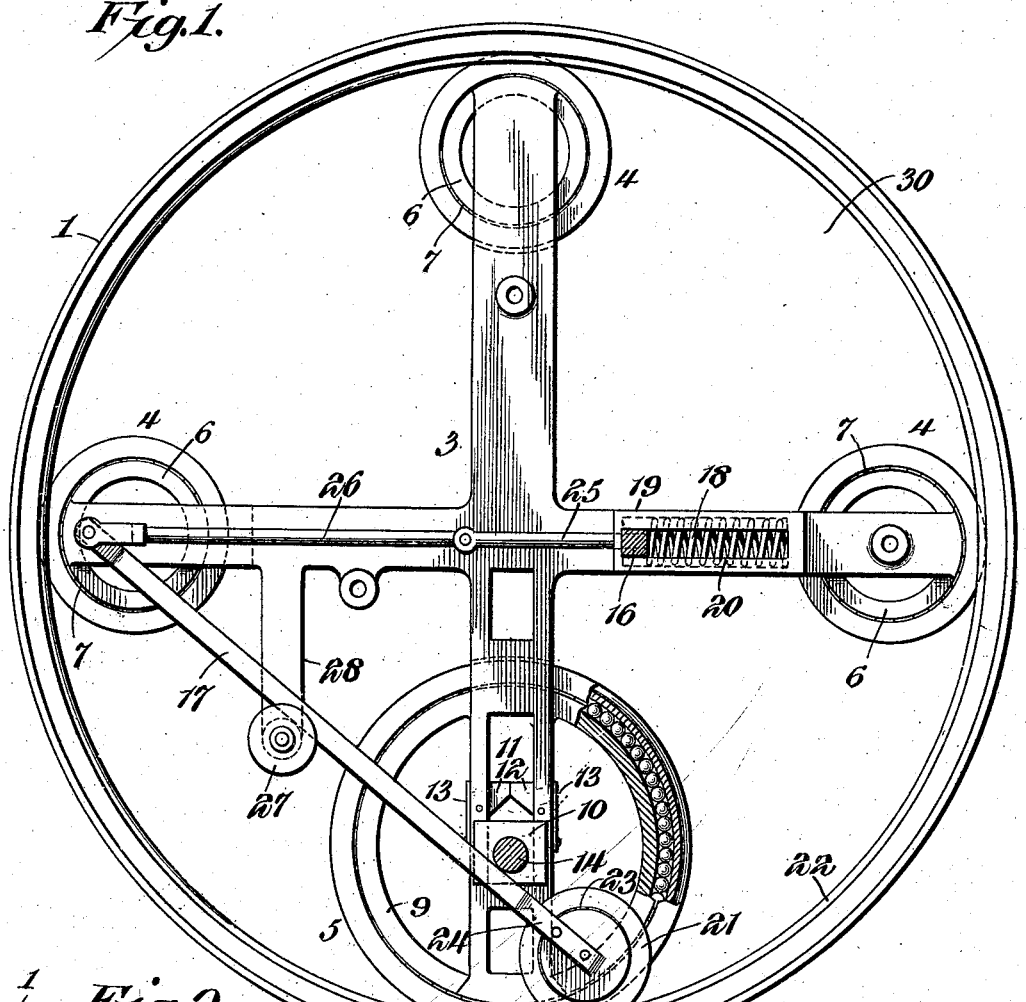
Figure 2:
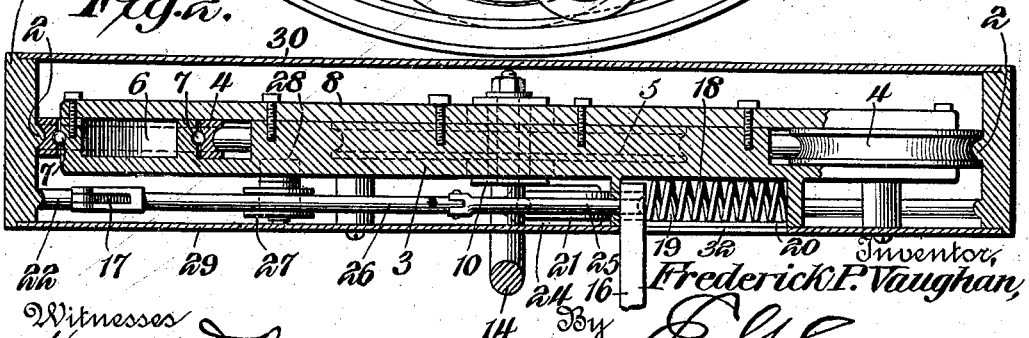
Figure 4:
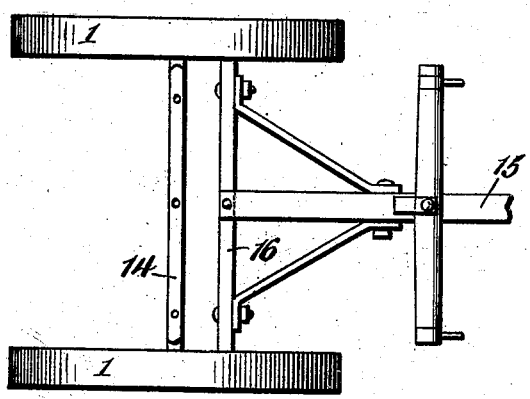
Figure 3:
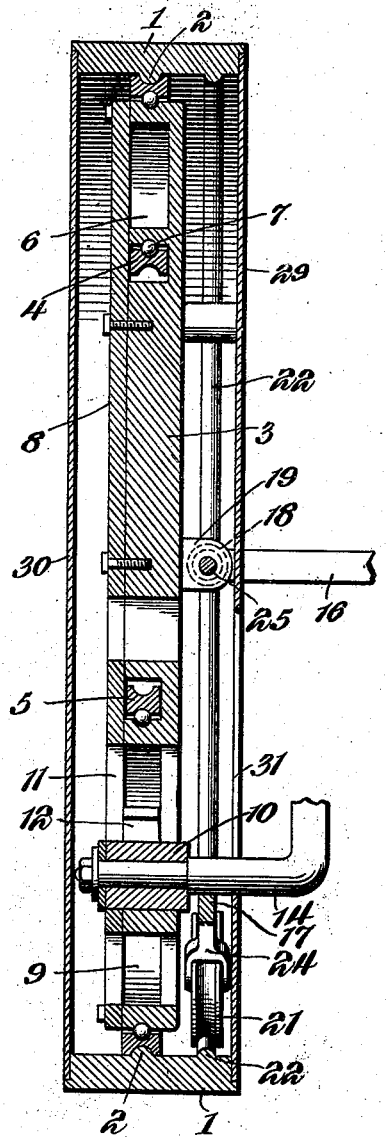
Figure 5:
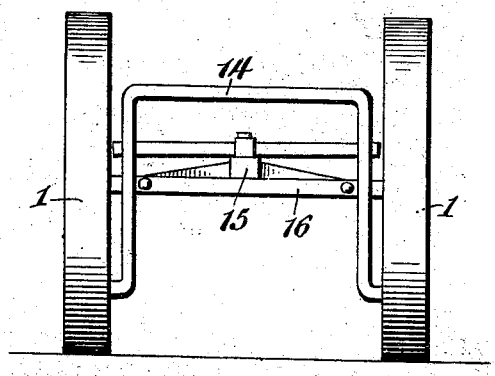

In the drawings:—Figure 1 is an elevation, partly in section, of a wheel constructed in accordance with this invention, the inner plate of the casing being removed. Fig. 2 is a central horizontal sectional view of the same. Fig. 3 is a central vertical sectional view of the wheel. Fig. 4 is a plan view of the front portion of a running gear, illustrating the arrangement of the draft devices with relation to the wheels and the front axle. Fig. 5 is a rear elevation of the same.

Like numerals of reference designate corresponding parts in all the figures of the drawings.

1 designates an outer rotary section or rim, designed to be constructed of any suitable material, and adapted to form a broad tread or periphery, as clearly shown in Figs. 2 and 3 of the drawings, but the wheel may be provided with any form of tread or tire to adapt it to the character of vehicle or machine on which it is to be applied. The outer rotary section or rim is provided with a central track 2, consisting of a rib, which is preferably semi-circular in cross section, and which receives rotary elements of an inner section or member 3. The inner section or member 3, which is mounted for rotary movement independently of the outer section or rim, may be of any preferred form, and, in the accompanying drawings it is shown consisting of four spokes or arms arranged vertically and horizontally, the vertical arms or spokes constituting a support for carrying the load. The arms or spokes of the inner section or member are provided at their outer ends with rotary elements, arranged to run on the said track 2, and consisting of wheels 4 and 5, having grooved rims or peripheries to receive the track 2, whereby the inner section or member is interlocked with the outer section or rim. The wheels 4, which are mounted on the horizontal arms or spokes and on the upper vertical arm or spoke, are smaller than the wheel 5, which is arranged at the lower vertical arm or spoke. These wheels, which may be of any desired diameter, constitute anti-friction devices for enabling the outer section or rim and the inner section or member to have free frictionless rotary movement.

Each of the wheels 4 consists of an outer section or rim, and an inner section or member 6, anti-friction balls 7 being interposed between the outer section or rim and the inner section or member. The inner sections or members 6 are rigid with the spokes or arms, which preferably consist of a body portion and a removable plate or section 8, as clearly shown in Figs. 2 and 3 of the drawings. The section or plate 8 being detachable permits the parts to be readily assembled. The bottom wheel 5 also consists of an outer rim or section and an inner section or member 9, which is rigid with the lower arm or spokes of the inner section or member 3. The lower arm or spoke of the inner section or member 3 is provided with vertically adjustable load carrying means, constructed substantially the same as the means shown in an application for Letters Patent filed by me on or about March 5, 1906, Serial No. 304,385. The load carrying means consists of a block or member 10, slidable in a slot or opening 11 of the lower spoke or arm of the section 3, which is provided with pivoted dogs 12, adapted to support the block or member 10 in an elevated position. The dogs are pivoted at their lower portions, and their outer edges are engaged by springs 13.

The block 10 is provided with an opening for the reception of an axle 14, or other load carrying device, and although the axle is shown arched in Fig. 5 of the drawings, it will be apparent that this is not necessary, as the means for adjusting the load vertically may be relied on for supporting the load at the desired elevation.

The draft is applied to the wheel in advance of the load carrying means, so that the wheel will operate in the manner described in the aforesaid application in pasing over an obstruction. The forward rotation of the wheel is further assisted in the present invention, by the means hereinafter described, for positively shifting or moving the load over the vertical center of the wheel to a point in advance of the same, whereby the weight of the load will operate directly on the front portion of the wheel to assist the rotation of the same. This will be found particularly advantageous in starting a heavy load. The tongue 15, shown in Figs. 4 and 5, is secured at its rear end to a transverse bar 16, which is connected with a lever 17, and which also transmits pressure of the draft on the front portion of the wheel through a cushioning spring 18. The cushioning spring 18 constitutes yieldable means for engaging the transverse draft bar with the front portion of the wheel, and it is housed within a suitable casing 19, which is provided with a longitudinal slot 20 to receive the end of the transverse draft bar 16.

The lever 17, which constitutes load shifting means, is arranged in an inclined position when the load carrying block or member 10 is located at the vertical diameter of the wheel, and the lower end of the said lever is provided with a rotary element 21, consisting of a grooved wheel arranged to run on a track 22 of the outer rotary section or rim 1. The track 22 is formed by a rib, which is semi-circular in cross section, and the rotary element or wheel 21 is composed of inner and outer sections, and is provided with an interposed series of antifriction devices 23. The lower end 24 of the lever is forked, and is suitably secured to the inner section or member of the wheel 21. The upper end of the lever is connected with the bar 16 by means of a connecting rod, which is composed of two sections or members 25 and 26. The section 25, which is secured to the bar 16, slides through an opening in the rear end of the casing 19 of the spring 18, and the rear section or member 26 is pivoted to the front section or member 25 and to the upper end of the lever 17, and is adapted to swing upwardly and downwardly to yield to the movements of the load shifting lever 17.

The load shifting lever is fulcrumed at its lower end, and when its upper end is moved forwardly through the draft, the inner section or member 3 will be partially rotated through the action of the lever, which engages the axle 14, as clearly shown in Fig. 1 of the drawings. The engagement between the lever and the load carrying means is at an intermediate point on the lever, and the lower arm thereof is much shorter than the upper arm, whereby a load may be easily shifted to a point in advance of the vertical diameter of the wheel, whereby the load will assist the forward rotation of the same. It is not necessary to engage the lever with the axle of the load carrying means, as this engagement may be effected through the engagement of the lever with any other portion of the load carrying or supporting means. The load is shifted simultaneously with the application of the draft to the front portion of the wheel, and it will be clear that by this arrangement and operation, a heavy load may be easily started or moved over a stone or other obstruction.

The inner rotary section or member 3 is provided with a grooved wheel 27, forming a rotary guide for the lever and mounted on a hanger 28, which consists of an arm depending from the rearwardly extending horizontal spoke. When the connecting rod is moved rearwardly, the lever is brought into engagement with the rotary guiding means, which causes the lower front end of the lever to move forwardly beneath the axle. The forward pull on the draft mechanism operates to swing the upper arm of the lever forwardly, and as the upper arm of the lever rises above the horizontal diameter of the wheel, the pull will be, in a measure, downward, and thereby operate to retain the lever in engagement with the axle. This will effect a slight forward shifting of the load, which will assist in starting the wheel. Any obstruction in the path of the wheel, or any means tending to resist the forward rotation of the same, will cause the lever to operate to a greater or less degree.

The wheel is provided with a casing consisting of inner and outer plates 29 and 30 and adapted to protect the parts from dust, and, at the same time, form guards. The inner plate is carried by the inner section or member 3, and extends into an annular recess of the outer section or rim. This inner plate is provided with a vertical slot 31, to permit an adjustment of the axle, and it has a horizontal slot 32 which receives the transverse draft bar 16. The outer plate 30 is secured to the outer section or rim and is carried by the same, the rim being provided at its outer edge with an annular recess to receive the periphery of the outer plate. The wheel may, however, be incased in any other preferred manner.

Having thus fully described my invention, what I claim as new and desire to secure by Letters Patent, is:—

1. A wheel of the class described comprising an outer rotary section or rim, an inner section or member mounted for independent movement and carrying means for supporting a load, said wheel being provided with means for connecting the draft to it, and means operated by the draft for shifting the position of the load.

2. A wheel of the class described comprising an outer rotary section or rim, an inner section or member mounted for independent rotary movement and carrying means for supporting a load, means for shifting the position of the load, and means for connecting the draft with the wheel for simultaneously operating the load shifting means.

3. A wheel of the class described comprising an outer rotary section or rim, an inner section or member mounted for independent rotary movement, and carrying means for supporting a load, means for shifting the position of the load, and means for applying the draft to the wheel in advance of the load carrying means and for simultaneously operating the load shifting means.

4. A wheel of the class described comprising an outer rotary section or rim, an inner section or member mounted for independent rotary movement and carrying means for supporting a load, yieldable means for applying the draft to the wheel, and means operated by the latter means for shifting the position of the load.

5. A wheel of the class described comprising an outer rotary rim or section, an inner support mounted for independent rotary movement and carrying means for supporting a load, a lever arranged to shift the position of the load, and means for connecting the draft with the lever.

6. A wheel of the class described comprising an outer rotary section or rim, an inner support mounted for independent rotary movement and carrying means for supporting a load, a lever fulcrumed on the outer rim or section and arranged to shift the position of the load, and means for connecting the draft with the lever.

7. The combination with a wheel having a shiftable load carrying member, a lever for shifting the position of the same, and means for connecting the draft with the lever.

8. The combination of a wheel having a shiftable load carrying member, and means embodying a lever for shifting the position of the load, said lever being fulcrumed at one end and connected at the other end with the draft.

9. The combination of a wheel provided with an outer rotary section or rim and having a shiftable member provided with means for normally supporting a load at the vertical diameter of the wheel, and means embodying a lever for shifting the position of the load, said lever being fulcrumed on the outer rotary rim or section and connected with the draft.

10. The combination of an outer rotary section or rim, an inner section or member mounted for independent rotary movement and carrying means for supporting a load, an inclined lever provided at its lower end with a rotary element arranged on the outer section or rim on which the lever is fulcrumed, said lever having an intermediate load shifting portion, and means for connecting the draft with the upper arm of the lever.

11. The combination of an outer rotary section or rim, an inner shiftable member carrying means for supporting a load, yieldable means for connecting the draft with the inner member, a lever fulcrumed on the outer section or rim and having an intermediate portion arranged to shift the position of the load, and connecting means between the lever and the said yieldable means.

12. A wheel comprising an outer rotary section or rim, an inner section or member mounted for independent rotary movement and carrying means for supporting a load, means for applying the draft to the inner section or member, a spring for cushioning the draft, and a lever fulcrumed on the outer section or rim and connected with the means for applying the draft to the wheel, said lever being arranged to shift the position of the load.

13. A wheel comprising an outer section or rim, an inner section or member mounted for independent rotary movement and carrying means for supporting a load, a draft bar movable on the inner section or member, a cushion arranged in advance of the draft bar and receiving the same, an inclined lever fulcrumed on the outer rim or section for shifting the position of the inner section or member, and means for connecting the draft bar with the lever.

14. A wheel comprising a rotary outer section or rim, an inner section or member mounted for independent rotary movement and carrying means for supporting a load, an inclined lever fulcrumed at its lower end on the outer section or rim and arranged to shift the position of the inner section or member, means for connecting the draft with the lever, and a rotary guide carried by the inner section or member and arranged to receive the lever.

15. A wheel of the class described comprising an outer section or rim having interior tracks, an inner section or member provided with rotary elements arranged on one of the tracks and carrying means for supporting a load, and means for shifting the position of the load, said means embodying a lever having a rotary element arranged to run on the other track.

In testimony whereof I affix my signature in presence of two witnesses.

FREDERICK P. VAUGHAN.

Witnesses:
JOHN H. SIGGERS,
H. F. RILEY.